(12) United States Patent
Li (10) Patent No.: US 11,504,745 B2
(45) Date of Patent: Nov. 22, 2022

(54) ITEM SORTING SYSTEM AND METHOD (71) Applicant: Beijing Geekplus Technology Co., Ltd., Beijing (CN)

(72) Inventor: Hongbo Li, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/078,966

(22) PCT Filed: Dec. 12, 2017

(86) PCT No.: PCT/CN2017/115753
§ 371 (c)(1),
(2) Date: Jun. 22, 2021

(87) PCT Pub. No.: WO2019/061847
PCT Pub. Date: Apr. 4, 2019

(65) Prior Publication Data
US 2022/0062953 A1   Mar. 3, 2022

(30) Foreign Application Priority Data

Sep. 30, 2017   (CN) .......................... 201710928946.8

(51) Int. Cl.
*B07C 5/36* (2006.01)
*G06K 17/00* (2006.01)
(Continued)

(52) U.S. Cl.
CPC ............ *B07C 3/02* (2013.01); *G06K 7/10366* (2013.01); *G06K 7/1417* (2013.01); *G06Q 10/083* (2013.01); *B07C 2501/0063* (2013.01)

(58) Field of Classification Search
CPC ... B07C 3/02; B07C 2501/0063; B65G 1/137; B65G 1/0492; G06K 7/10366; G06K 7/1417; G06Q 10/083
(Continued)

(56) References Cited

U.S. PATENT DOCUMENTS

2007/0203612 A1   8/2007   Mileaf
2012/0150342 A1   6/2012   Song et al.
2015/0332213 A1   11/2015  Galluzzo et al.

FOREIGN PATENT DOCUMENTS

CN   204724475 U   10/2015
CN   204817212 U   12/2015
(Continued)

OTHER PUBLICATIONS

Notice of Reasons for Refusal for JP2017-567226, dated Nov. 12, 2019.
(Continued)

*Primary Examiner* — Michael McCullough
*Assistant Examiner* — Molly K Devine
(74) *Attorney, Agent, or Firm* — Andrus Intellectual Property Law, LLP (57) ABSTRACT

Provided is an item sorting system and method. The system includes: a supply end configured to provide a to-be-sorted item in the first area; a moving transport apparatus configured to transport the to-be-sorted item in a second area; and an item receiving apparatus configured to receive the to-be-sorted item in a third area. The second area and the third are arranged in order without overlapping with each other.

15 Claims, 3 Drawing Sheets

(51) Int. Cl.
*G06Q 10/08* (2012.01)
*G06K 7/14* (2006.01)
*B07C 3/02* (2006.01)
*G06K 7/10* (2006.01)

(58) Field of Classification Search
USPC .......................................................... 209/707
See application file for complete search history.

(56) References Cited

FOREIGN PATENT DOCUMENTS

| CN | 105383843 A | 3/2016 |
| CN | 105858045 A | 8/2016 |
| CN | 205737747 U | 11/2016 |
| CN | 106269530 A | 1/2017 |
| CN | 107010370 A | 8/2017 |
| CN | 107127775 A | 9/2017 |
| JP | H11151627 A | 6/1999 |
| JP | 2000122720 A | 4/2000 |
| JP | 2009513457 A | 4/2009 |
| JP | 2015178141 A | 10/2015 |
| JP | 2016047744 | 4/2016 |
| KR | 20090082161 A | 7/2009 |
| KR | 20110090416 A | 8/2011 |
| WO | 2016067163 A | 5/2016 |
| WO | 2017012548 A | 1/2017 |

OTHER PUBLICATIONS

Examination Report for Australian Patent Application No. 2017434616, dated Apr. 1, 2021.
Notice of Reasons of Refusal for Japanese Patent Application No. 2020-700682, dated Dec. 11, 2020.
Search Report for Singaporean Patent Application No. 11202002969Y, dated Feb. 26, 2021.
Extended European Search Report for European Patent Application No. 17926964.2, dated Jun. 9, 2021.
International Search Report in corresponding PCT Application No. PCT/CN2017/115753, dated Jul. 4, 2018.
Office Action for Singapore Patent Application No. 11202002969Y, dated Mar. 8, 2022.
Office Action for Korean Patent Application No. 1020207012732, dated Mar. 3, 2022.

ITEM SORTING SYSTEM AND METHOD

CROSS-REFERENCES TO RELATED APPLICATIONS

This application is a national stage application under 35 U.S.C. 371 based on application PCT/CN2017/115753, which claims the benefit of and priority to China Application No. 201710928946.8, filed on Sep. 30, 2017, the disclosures of which are expressly incorporated herein by reference in their entirety.

TECHNICAL FIELD

The present disclosure relates to the field of intelligent logistics, and in particular to an item sorting system and method.

BACKGROUND

The rapid development of e-commerce not only brings unprecedented development opportunities to the express delivery industry, but also poses severe challenges to the express delivery service. It is a difficult problem for this industry to conduct efficient, low-cost, flexible and accurate parcel sorting. Traditional manual matrix sorting mainly involves problems such as low efficiency, high error rate, large working strength, difficulty in recruitment, and difficult management and so on. Cross-belt sorters and other traditional automated sorting devices mainly face problems of large investment, slow return, poor flexibility and poor expandability and so on. The utilization of the devices cannot be adapted to the requirements on the variation between peak and valley in various periods, and the cross-belt sorters belong to the serial system. In this system, the failure of one point on the trunk will cause the entire cross-belt sorting system to stop working. Therefore, flexible automated parcel sorting becomes a critical issue and an urgent need for the development of the express delivery industry. In recent years, the vigorous development of robotics technology brings tremendous technological changes to the entire logistics industry and brings new technologies and new design concepts to the sorting industry. The express robot sorting system adopts the form of "robot+steel platform". The operator at the supply table places the parcel on the robot carrying device. The robot carries the parcel, moves to the steel drop grid and delivers the parcel to the drop grid, so as to complete the parcel sorting task. The parcel sorting robot system described above greatly improves the sorting efficiency compared with the traditional manual sorting method, and has advantages such as low cost and high flexibility, compared with cross-belt sorters or other traditional automated sorting devices. Therefore, the parcel sorting robot system receives wide attention and rapid promotion in the industry.

Figure 1:
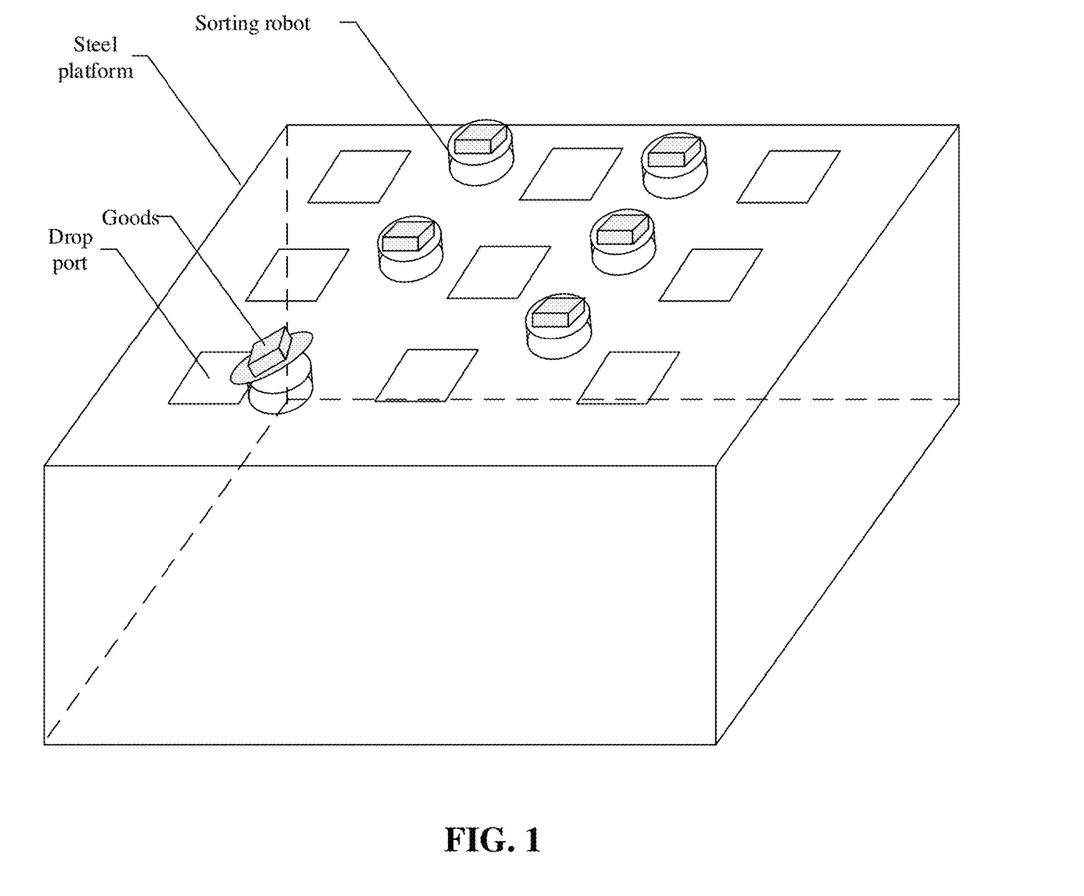
FIG. 1 is a schematic diagram of an item sorting system based on a high platform in the related art.

Existing parcel sorting robot systems (as shown in FIG. 1) have two main problems. First, the parcel sorting robot system adopts the structure of platform elevation (such as building a steel platform), and the robot runs on the platform. The parcel receiving container is located below the platform. Although this structure achieves the purpose of sorting, the construction and use of the platform make the system greatly compromised in terms of flexibility and cost. A breakthrough, more flexible and lower cost parcel sorting robot system and method are urgently required. Secondly, the drop grids are located within the robot movement area in the form of an array (as shown in FIG. 1, the drop grids are located within the steel platform in the form of an array). One robot executing the task of dropping parcel will cause other robots to wait or cross collision avoidance between robots, reducing the sorting efficiency of the entire system. In particular, when the number of robots in the system is large and the robot density is large, the waits or avoid of robots caused by the execution of dropping parcel task rapidly decreases the efficiency of the entire system. Therefore, it is one of the key issues of the engineering application that break the bottleneck of the efficiency of the existing parcel sorting robot system, reduce the wait or avoid caused by the robot dropping parcel, and effectively improve the efficiency of the parcel sorting robot system.

Therefore, there is an urgent need for a breakthrough, more flexible and lower cost parcel sorting robot system and method.

SUMMARY

In view of this, the present disclosure provides an item sorting system and method.

In a first aspect, the present disclosure provides an item sorting system, which includes:
a supply end configured to provide at least one to-be-sorted item, where the supply end forms a first area;
at least one moving transport apparatus configured to receive the to-be-sorted item and deliver the received the to-be-sorted item, where the moving transport apparatus transports the item within a second area; and
at least one item receiving apparatus configured to receive in a third area the to-be-sorted item delivered by the moving transport apparatus, where the second area and the third area are arranged in order without overlapping with each other.

In a second aspect, the present disclosure further provides an item sorting method, which includes:
distributing, by a supply end located in a first area, at least one to-be-sorted item;
receiving, by a moving transport apparatus, the to-be-sorted items from the supply end, delivering the received to-be-sorted item through a specific transport path, where the moving transport apparatus transports the item within a second area; and
receiving, by an item receiving apparatus, in a third area the to-be-sorted item delivered by the moving transport apparatus, where the bottom of the item receiving apparatus and the bottom of the moving transport apparatus are on the same plane, and the first area, the second area and the third area are arranged in order without overlapping with each other.

The present disclosure provides an item sorting system and method. The supply end, the moving transport apparatus and the item receiving apparatus are arranged in the same plane. Therefore, the construction of the item sorting system does not require special auxiliary apparatus such as elevated platforms, such that the construction cost is greatly reduced. The system can be set on any plane, which greatly improves the ease of use and portability of the product. Moreover, the second area serving as the transport section and the third area serving as the dropping parcel end do not overlap. This can reduce the waiting time of the moving transport apparatus in the execution of the dropping items causing the wait time of other moving transport apparatus or avoid time between robots, thereby greatly improving the delivery efficiency of the item sorting system.

DETAILED DISCLOSURE

The present disclosure is described below in detail in conjunction with the drawings.

It should be clear that the described embodiments are merely a part of the embodiments of the present disclosure and not all the embodiments. Based on the embodiments of the present disclosure, all other embodiments obtained by those skilled in the art without creative work shall fall within the protection scope of the present disclosure.

FIG. 1 is a schematic diagram of an item sorting system based on a high platform in the related art. As shown in FIG. 1, the system adopts an item sorting structure of "robot+high platform". The drop port are arranged within the sorting robot movement area in the form of an array. A robot executing the task of dropping parcel will cause other robots to wait or cross collision avoidance between robots, reducing the sorting efficiency of the entire system. In particular, when the number of robots in the system is large and the robot density is large, the waits or avoid of robots caused by the execution of dropping parcel task greatly decreases the efficiency of the entire system.

In addition, this structure requires to build a high platform while achieving the purpose of sorting. However, the construction and use of the platform increases the construction cost, the difficulties exited in porting the platform, and resulted in a low usability.

Figure 2:
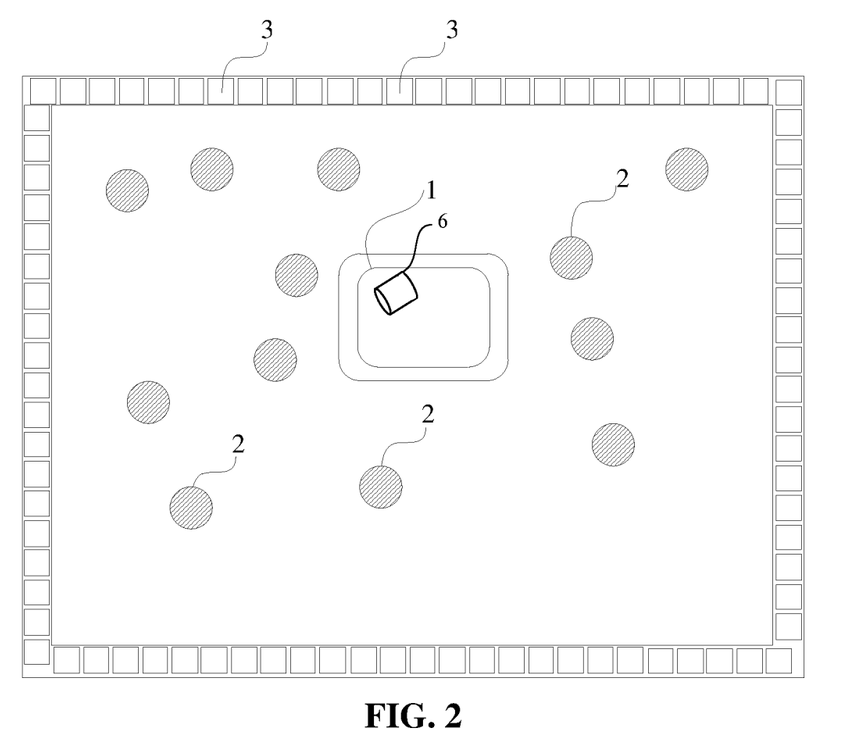
FIG. 2 is a schematic diagram of an item sorting system according to an embodiment of the present disclosure.

As shown in FIG. 2, the present disclosure provides an item sorting system. The item sorting system includes a supply end 1, a moving transport apparatus 2 and an item receiving apparatus 3.

The supply end 1, which provides one or more to-be-sorted items, and the supply end 1 forms a first area. The supply end 1 is loaded with items requiring sorted (to-be-sorted items). The items may be logistics parcels that need to be transported, or may be other items or commodities that need to be sorted and distributed. At the supply end, the to-be-sorted items may be transported manually or automatically by being placed on the moving transport apparatus.

In order to determine the specific destinations to which the to-be-sorted items are transported; each to-be-sorted item is generally provided with a transportation label for storing delivery information. The transportation label may be a two-dimensional code, a Radio Frequency Identification (RFID) label or the like. The delivery information of the to-be-sorted items include at least the destination information of the items (such as Guangzhou, Shanghai, Shenyang and so on), and other information can be contained.

In order to quickly identify the delivery information of the to-be-sorted items, the supply end may specifically include a delivery information acquisition apparatus 6 for identifying the delivery label on the to-be-sorted items. The delivery information acquisition apparatus 6 may be a camera which acquires label information such as the two-dimensional code on the to-be-sorted items, and then acquires the delivery information of the to-be-sorted items. In addition, the delivery information acquisition apparatus 6 may be an RFID card reader that reads the RFID label information on the to-be-sorted items and then acquires the delivery information of the to-be-sorted items.

Reasonably setting the supply end has an important role in optimizing the transport path and improving the delivery efficiency of the items. For this purpose, the supply end is set in the first area.

The moving transport apparatus 2 receives the to-be-sorted items from the supply end 1 and delivers the received to-be-sorted items through a specific transport path. The moving transport apparatus 2 operates within a second area.

The moving transport apparatus may be a moving robot. A drive apparatus is mounted inside the drive apparatus and makes the moving robot move in a plane. In addition, an item receiving apparatus is set on the moving transport apparatus, and the item receiving apparatus may receive items (e.g., express delivery) distributed by the supply end. In order to acquire the transportation task, the moving transport apparatus may be connected with the task server through a network, and the task server may acquire the current task state of all the moving transport apparatus. For the moving transport apparatus without transportation task, the task server distributes the task by dispatching the moving transport apparatus to the supply end.

In order to facilitate the operation of the moving transport apparatus, in one or more embodiments, the moving transport apparatus is internally equipped with a battery, so that the moving transport apparatus can complete the transportation task with its own energy. The moving transport apparatus monitors the remaining battery power in real time. When the remaining power of the moving transport apparatus reaches a preset threshold, the moving transport apparatus is controlled to be charged at a preset area.

The moving transport apparatus may acquire transportation tasks. For example, the moving transport apparatus needs to transport an express parcel destined for Shenyang, and the moving transport apparatus needs to acquire the specific position of the item receiving apparatus 3 corresponding to the express parcel destined for Shenyang. The moving transport apparatus may acquire the specific position of the item receiving apparatus 3 through the task server. On the other hand, the moving transport apparatus may pre-store the position distribution map of all the item receiving apparatus 3 and query the content data of the moving transport apparatus to transport the to-be-sorted items to their destinations.

The moving transport apparatus operates within the second area. In one or more embodiments, the second area may surround or partially surround the first area, so that the to-be-sorted items can be transported, the moving transport apparatus to radially or semi-radially.

The item receiving apparatus 3, which receives the to-be-sorted items, transported by the moving transport apparatus 2, in a third area, and the bottom of the item receiving apparatus 3 and the bottom of the moving transport apparatus 2 are on the same plane. The first area, the second area, and the third area are arranged in order without overlapping with each other.

Specifically, the item receiving apparatus 3 may be a cage car, or may be other types of containers that can receive the to-be-sorted items. As shown in FIG. 1, in the high platform in the related art, the item receiving apparatus 3 is generally placed below the drop port of the platform and receives the item from the drop port to complete the reception of the to-be-sorted items. In the present disclosure, the bottom of the item receiving apparatus 3 and the bottom of the moving transport apparatus 2 are in the same plane. This eliminates the need to assume a high platform and saves construction costs. At the same time, when it is necessary to adjust the position of the item receiving apparatus 3, the related art is constrained by the high platform, and the item receiving apparatus 3 needs to be bound to the drop port. In the present disclosure, the item receiving apparatus 3 may be placed anywhere in the third area, so that the flexible placement mode can meet the needs of different types of installation sites.

In order to ensure that the moving transport apparatus 2 is able to find the corresponding item receiving apparatus 3, it is necessary to establish a position identification for each item receiving apparatus 3, so that the moving transport apparatus can find the corresponding item receiving apparatus 3 according to the position information of the destination corresponding to its execution task. In one or more embodiments, a matrix type two-dimensional code identifier may be arranged on the plane of the item sorting platform. Different two-dimensional codes represent different geographical positions, and the moving transport apparatus reaches the preset position by identifying the two-dimensional code. Alternatively, the item receiving apparatus 3 is internally equipped with a position label which can automatically transmit signals (such as wireless signals), and the moving transport apparatus 2 automatically plans the route to the item receiving apparatus 3 through the wireless signals.

After the items are transported by the item receiving apparatus 3, the moving transport apparatus 2 automatically records the latest position of the item receiving apparatus 3, and reports the latest position to the task server, or broadcasts the latest position to other moving transport apparatus.

With the arrangement described above, the second area and the third area are arranged in order without overlapping with each other, which ensures that the moving transport apparatus 2 does not have congestion queue during transportation. This overcomes the situation shown in FIG. 1, that the third area formed by the drop ports and the second area formed by the sorting robot overlap with each other, and thus improves the delivery efficiency.

Figure 4:
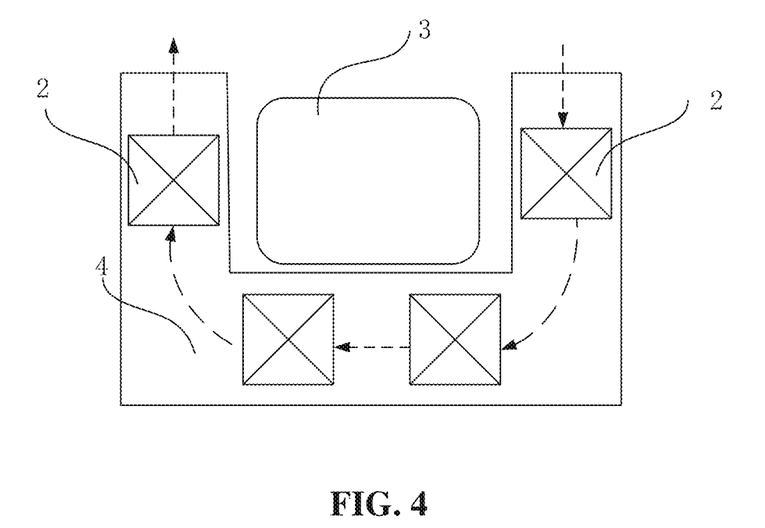
FIG. 4 is a schematic diagram of another item sorting system according to an embodiment of the present disclosure.

In an application case, as shown in FIG. 4, a scheduling area 4 is located between the second area and the third area. The scheduling area 4 partially or completely surrounds the third area. In this way, the moving transport apparatus 3 may deliver items to the item receiving apparatus successively through the scheduling area 4 and then leave in turn.

According to an alternative embodiment of the present disclosure, the bottom of the supply end 1 and the bottom of the moving transport apparatus 2 are on the same plane. In this way, the item sorting apparatus of the present disclosure can be installed on any ground or building level with a uniform plane.

In one or more embodiments, the second area is an annular area, and the first area is located in the inner annular area of the second area.

In one or more embodiments, the third area is an annular area, and the second area is located in the inner annular area of the third area.

In one or more embodiments, the first area, the second area and the third area are arranged in parallel and in order.

In one or more embodiments, the second area and the third area are distributed in a semi-annular, the second area surrounds the first area, and the third area surrounds the second area.

Figure 5:
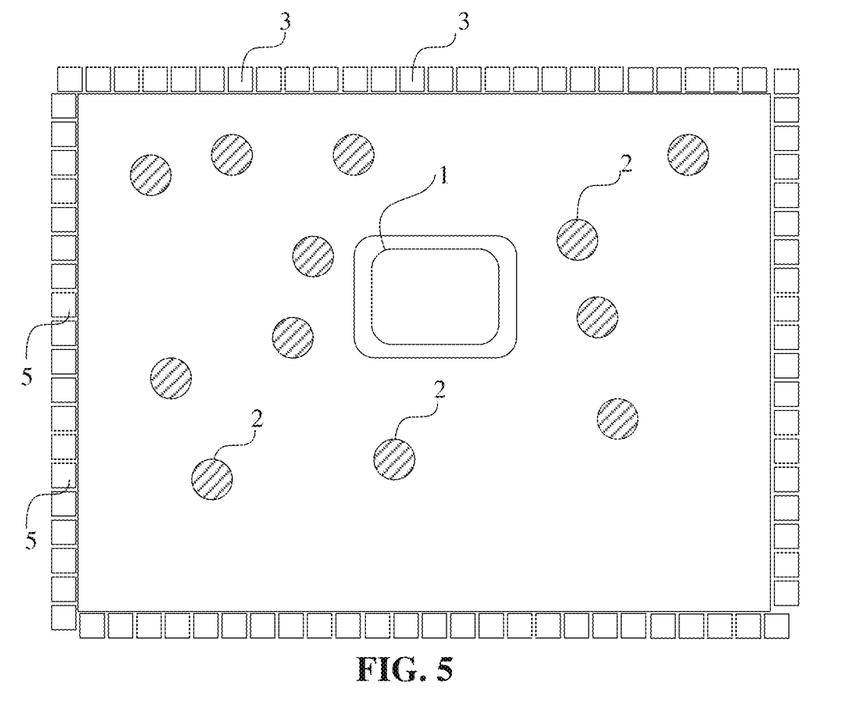
FIG. 5 is a schematic diagram of another item sorting system according to an embodiment of the present disclosure.

In one or more embodiments, as shown in FIG. 5, the third area includes multiple independent areas 5, and the independent areas are arranged in order and sequentially at the edge of an annular area of the second area.

In one or more embodiments, the system further includes a delivery information acquisition apparatus 6 and a control system.

The delivery information acquisition apparatus 6 is configured to acquire the item information provided by the supply end 1. Specifically, the delivery information acquisition apparatus 6 may be a camera. The delivery information of the item, provided by the supply end 1, may be scanned through the camera. The delivery information may be a two-dimensional code or a piece of text. The delivery information acquisition apparatus 6 acquires the corresponding item information through image recognition technology. In addition, the delivery information acquisition apparatus 6 may directly read the information in the radio frequency label when the delivered item contains a radio frequency (such as RFID) label, and get the item information.

In one or more embodiments, the item information includes the destination of the item.

In one or more embodiments, the delivery information acquisition apparatus 6 is located at the supply end 1.

In one or more embodiments, the system further includes a transport platform.

The transport platform supports the moving transport apparatus 2 for transportation of the to-be-sorted items. The transport platform is one of a ground, a platform or an orbital network. That is, the item sorting apparatus in the present disclosure may be implemented on a common plane or on a specific platform or track.

In one or more embodiments, the system further includes a control system.

The control system respectively communicates with the delivery information acquisition apparatus 6 and the moving transport apparatus 2, for transmitting the item information, acquired by the delivery information acquisition apparatus 6, to the moving transport apparatus 2. Specifically, the control system may include a task server. The task server is in communication connection with the delivery information acquisition apparatus 6 and the moving transport apparatus 2. When the delivery information acquisition apparatus 6 cannot read the item information normally, the control system controls the moving transport apparatus to deliver the item corresponding to the item information failing to be read out normally to a specified position. Alternatively, the control system controls the supply end to retrieve the item corresponding to the item information failing to be read normally, or the control system controls the delivery information acquisition apparatus or the moving transport apparatus 6 to prompt information.

In one or more embodiments, the control system acquires the operating state of the moving transport apparatus 2; when the moving transport apparatus 2 has an operational fault, the control system controls the moving transport apparatus 2 to move to a fourth area. In this way, faulty moving transport apparatus can be brought together to facilitate uniform maintenance, and faulty moving transport apparatus are prevented from affecting operation of normal moving transport apparatus.

In one or more embodiments, the control system acquires the number of the to-be-sorted items on the supply end 1, and determines the number of the moving transport apparatus 2 in operation based on the number. For example, when the total number of the moving transport apparatus 2 is 100, calculation of the number of to-be-sorted items turns out that only 15 moving transport apparatus 2 are required. In this case, only 15 moving transport apparatus 2 may be invoked, which can be maximized energy savings. The number of moving transport apparatus 2 in the second area is reduced, and single operating space of the moving transport apparatus 2 is increased, which can improve the delivery efficiency of the moving transport apparatus 2.

In one or more embodiments, the control system acquires the operating state of the moving transport apparatus 2; and, for the moving transport apparatus 2 without task in a preset period, the control system controls the moving transport apparatus into enter a dormant state. In addition to dormant state, other manners similar to dormant state may be used, which can save the power of the moving transport apparatus 2.

In one or more embodiments, the control system acquires the operating state of all moving transport apparatus 2 in operation. When the number of moving transport apparatus 2 with operational faults exceeds a preset threshold, the control system controls the item sorting system enter an emergency stop state.

In one or more embodiments, the control system acquires the power usage information of the moving transport apparatus 2, and when the remaining power of the moving transport apparatus 2 is less than a preset threshold, the control system controls the moving transport apparatus 2 move to a fifth area for charging.

In one or more embodiments, the control system acquires the number of the to-be-sorted items on the supply end 1, and controls the rearrangement of the item receiving apparatus in the third area based on the number. When it is necessary to rearrange, the item receiving apparatus may be placed in position manually or through a positioning apparatus (e.g., a positioning robot) in the system. The positioning apparatus rearranges the item receiving apparatus 3 in the third area based on a rearrangement instruction of the control system to the item receiving apparatus 3. The positioning apparatus may be the moving transport apparatus 2 or a dedicated robot for position placement. After the positioning apparatus receives the system instruction, the item receiving apparatus 3 is rearranged by recognizing each item receiving apparatus 3. After the position placement is completed, the latest placed position is reported to the control system. The control system acquires the latest destination information of the rearranged item receiving apparatus 3, and transmits the latest destination information to the moving transport apparatus 2.

In one or more embodiments, the moving transport apparatus 2 may self-identify the delivery information of the to-be-sorted items, and based on the delivery information, the items, distributed to the moving transport apparatus 2, are transported to the corresponding item receiving apparatus 3.

In one or more embodiments, the moving transport apparatus 2 may acquire its own operating state. When the moving transport apparatus is in a fault state, the moving transport apparatus 2 moves to a sixth area by itself.

In one or more embodiments, the moving transport apparatus 2 monitors its own operating state, and when the moving transport apparatus 2 has no task in a preset period, the moving transport apparatus 2 enters a dormant state on its own.

In one or more embodiments, the moving transport apparatus 2 monitors its own power usage state, when the remaining power of the moving transport apparatus 2 is less than a preset threshold, the moving transport apparatus 2 moves to the seventh area for charging on its own.

In one or more embodiments, the moving transport apparatus 2 may use various methods to navigate. As an approach, the moving transport apparatus 2 may navigate by identifying graphic combination. The graphic combination may be a two-dimensional code, or may be any combination of other graphics. The moving transport apparatus 2 judges the current geographical position information by identifying the graphic combination. Alternatively, the moving transport apparatus 2 may navigate through GPS or other methods that can be used for positioning. In addition, the moving transport apparatus 2 may use system navigation. The item sorting system detects the current position coordinates of the moving transport apparatus 2 and transmits the detected position coordinates of the moving transport apparatus 2 to the moving transport apparatus 2 through a common wired or wireless communication network (e.g., bluetooth, wifi, wireless communication). The navigation of the moving transport apparatus 2 is realized by the movement tendency of the moving transport apparatus 2 and related paths.

Corresponding to the devices described above, the present disclosure further provides an item sorting method, including the following steps.

Figure 3:
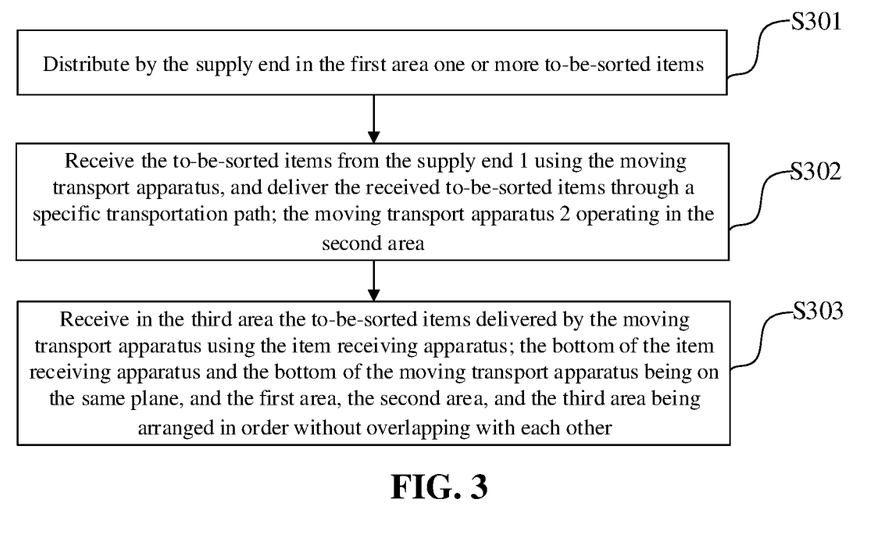
FIG. 3 is a schematic diagram of an item sorting flow according to an embodiment of the present disclosure.

In step 301, one or more to-be-sorted items are distributed from the supply end 1 located in the first area.

The supply end 1 forms the first area. The end 1 is loaded with items requiring sorted (to-be-sorted items). The items here may be logistics parcels that need to be transported, or other items or commodities that need to be sorted and delivered. At the supply end, the to-be-sorted items, which need to be transported, are placed on the moving transport apparatus manually or automatically.

In order to be able to determine the specific transportation destination of the to-be-sorted items, transportation labels are generally provided on the to-be-sorted items for storing the delivery information. The transportation labels can be a two-dimensional code, a RFID label or the like. The delivery information of the to-be-sorted items include at least the destination information of the items (such as Guangzhou, Shanghai, Shenyang and so on), and other information can be contained.

In order to quickly identify the delivery information of the to-be-sorted items, the supply end may specifically include a delivery information acquisition apparatus 6 for identifying the delivery label on the to-be-sorted items. The delivery information acquisition apparatus 6 may be a camera which acquires label information such as the two-dimensional code on the to-be-sorted items, and then acquires the delivery information of the to-be-sorted items. In addition, the delivery information acquisition apparatus 6 may be an RFID card reader that reads the RFID label information on the to-be-sorted items and then acquires the delivery information of the to-be-sorted items.

Reasonably setting the supply end has an important role in optimizing the transport path and improving the delivery efficiency of the items. For this purpose, the supply end is set in the first area.

In step 302, the to-be-sorted items are received from the supply end 1 using the moving transport apparatus 2, the received to-be-sorted items are delivered through a specific transportation path. The moving transport apparatus 2 operates in the second area.

The moving transport apparatus may be a moving robot. A drive apparatus is mounted inside the drive apparatus and makes the moving robot move in a plane. In addition, an item receiving apparatus is set on the moving transport apparatus, and the item receiving apparatus may receive items (e.g., express delivery) distributed by the supply end. In order to acquire the transportation task, the moving transport apparatus may be connected with the task server through a network, and the task server may acquire the current task state of all the moving transport apparatus. For the moving transport apparatus without transportation task, the task server distributes the task by dispatching the moving transport apparatus to the supply end.

In order to facilitate the operation of the moving transport apparatus, in one or more embodiments, the moving transport apparatus is internally equipped with a battery, so that the moving transport apparatus can complete the transportation task with its own energy. The moving transport apparatus monitors the remaining battery power in real time. When the remaining power of the moving transport apparatus reaches a preset threshold, the moving transport apparatus is controlled to be charged at a preset area.

The moving transport apparatus may acquire transportation tasks. For example, the moving transport apparatus needs to transport an express parcel destined for Shenyang, and the moving transport apparatus needs to acquire the specific position of the item receiving apparatus 3 corresponding to the express parcel destined for Shenyang. The moving transport apparatus can acquire the specific position of the item receiving apparatus 3 through the task server. On the other hand, the moving transport apparatus can pre-store the position distribution map of all the item receiving apparatus 3 and query the content data of the moving transport apparatus to transport the to-be-sorted items to their destinations.

The moving transport apparatus operates within the second area. In one or more embodiments, the second area may surround or partially surround the first area, so that the to-be-sorted items can be transported, the moving transport apparatus to radially or semi-radially.

In step 303, the to-be-sorted items delivered by the moving transport apparatus 2 are received in the third area using the item receiving apparatus 3, and the bottom of the item receiving apparatus 3 and the bottom of the moving transport apparatus 2 are on the same plane. The first area, the second area, and the third area are arranged in order without overlapping with each other.

Specifically, the item receiving apparatus 3 may be a cage car, or may be other types of containers that can receive the to-be-sorted items. As shown in FIG. 1, in the high platform in the related art, the item receiving apparatus 3 is generally placed below the drop port of the platform and receives the item from the drop port to complete the reception of the to-be-sorted items. In the present disclosure, the bottom of the item receiving apparatus 3 and the bottom of the moving transport apparatus 2 are in the same plane. This eliminates the need to assume a high platform and saves construction costs. At the same time, when it is necessary to adjust the position of the item receiving apparatus 3, the related art is constrained by the high platform, and the item receiving apparatus 3 needs to be bound to the drop port. In the present disclosure, the item receiving apparatus 3 can be placed anywhere in the third area, so that the flexible placement mode can meet the needs of different types of installation sites.

In order to ensure that the moving transport apparatus 2 is able to find the corresponding item receiving apparatus 3, it is necessary to establish a position identification for each item receiving apparatus 3, so that the moving transport apparatus can find the corresponding item receiving apparatus 3 according to the position information of the destination corresponding to its execution task. In one or more embodiments, a matrix type two-dimensional code identifier may be arranged on the plane of the item sorting platform. Different two-dimensional codes represent different geographical positions, and the moving transport apparatus reaches the preset position by identifying the two-dimensional code. Alternatively, the item receiving apparatus 3 is internally equipped with a position label which can automatically transmit signals (such as wireless signals), and the moving transport apparatus 2 automatically plans the route to the item receiving apparatus 3 through the wireless signals.

After the items are transported by the item receiving apparatus 3, the moving transport apparatus 2 automatically records the latest position of the item receiving apparatus 3, and reports the latest position to the task server, or broadcasts the latest position to other moving transport apparatus.

In one or more embodiments, the bottom of the supply end 1 and the bottom of the moving transport apparatus 2 are on the same plane.

In one or more embodiments, the plane is a ground surface.

In one or more embodiments, the second area is an annular area, and the first area is located in the inner annular area of the second area.

In one or more embodiments, the third area is an annular area, and the second area is located in the inner annular area of the third area.

In one or more embodiments, the third area includes multiple independent areas, and the independent areas are arranged in order and sequentially at the edge of an annular area of the second area.

In one or more embodiments, the method further includes the following step.

The item information provided by the supply end 1 is acquired using the delivery information acquisition apparatus 6.

In one or more embodiments, the item information includes the destination of the item.

In one or more embodiments, the delivery information acquisition apparatus 6 is located at the supply end 1.

In one or more embodiments, the method further includes the following step.

The moving transport apparatus 2 is supported by the transportation platform for transportation of the to-be-sorted items.

In one or more embodiments, the transport platform is one of a ground, a platform or an orbital network.

In one or more embodiments, the method further includes the following step.

The item information, acquired by the delivery information acquisition apparatus 6, is transmitted to the moving transport apparatus 2, by the control system respectively communicating with the delivery information acquisition apparatus 6 and the moving transport apparatus 2.

In one or more embodiments, the control system acquires the operating state of the moving transport apparatus 2; and when the moving transport apparatus 2 has an operational fault, the control system controls the moving transport apparatus 2 to move to the fourth area.

In one or more embodiments, the control system acquires the number of the to-be-sorted items on the supply end 1, and determines the number of the moving transport apparatus 2 in operation based on the number.

In one or more embodiments, the control system acquires the operating state of the moving transport apparatus 2; when the moving transport apparatus 2 has no task in a preset period, and the control system controls the moving transport apparatus into enter a dormant state.

In one or more embodiments, the control system acquires the operating state of all moving transport apparatus 2 in operation. When the number of moving transport apparatus 2 with operational faults exceeds a preset threshold, the control system controls the item sorting system enter an emergency stop state.

In one or more embodiments, the control system acquires the power usage information of the moving transport apparatus 2, and when the remaining power of the moving transport apparatus 2 is less than a preset threshold, the control system controls the moving transport apparatus 2 move to a fifth area for charging.

In one or more embodiments, the control system acquires the number of the to-be-sorted items on the supply end 1, and controls the rearrangement of the item receiving apparatus in the third area based on the number.

In one or more embodiments, the method further includes the following step.

The item receiving apparatus 3 is rearranged in the third area based on a rearrangement instruction of the item receiving apparatus 3 from the control system using a positioning apparatus.

In one or more embodiments, the control system acquires the latest destination information of the rearranged item receiving apparatus 3, and transmits the latest destination information to the moving transport apparatus 2.

In one or more embodiments, the moving transport apparatus 2 may self-identify the delivery information of the to-be-sorted items, and based on the delivery information, the items, distributed to the moving transport apparatus 2, are transported to the corresponding item receiving apparatus 3.

In one or more embodiments, the moving transport apparatus 2 may acquire its own operating state. When the mobile end is in a fault state, the moving transport apparatus 2 moves to a sixth area by itself.

In one or more embodiments, the moving transport apparatus 2 monitors its own operating state, for the moving transport apparatus 2 without task in a preset period, the moving transport apparatus 2 enters a dormant state on its own.

In one or more embodiments, the moving transport apparatus 2 monitors its own power usage state, when the remaining power of the moving transport apparatus 2 is less than a preset threshold, the moving transport apparatus 2 moves to the seventh area for charging on its own.

It can be understood that the terms "a" and "an" should be understood to mean "at least one" or "one or more", in an embodiment, the number of elements can be one, and in other embodiments, the number of elements can be multiple, and the terms "a" and "an" cannot be understood as a limitation of number.

Although ordinal numbers such as "first", "second" and the like will be used to describe various components, those components are not limited herein. These terms are only used to distinguish one component from another. For example, a first component can be called a second component and the like, a second component can also be called a first component without departing from the teachings of the concept of the present disclosure. The term "and/or" used herein includes any and all combinations of one or more of the associated listed items.

The terms used herein is only for the purpose of describing various embodiments not intended to be limiting. As used herein, the singular forms are intended to include the plural forms as well, unless the context clearly indicates otherwise. It should be further understood that the terms "including" and/or "having", as used in this specification, specify the presence of stated features, numbers, steps, operations, components, elements or combinations thereof, and not excluding the presence or addition of one or more other features, numbers, steps, operations, components, elements or groups thereof.

Terms used herein including technical and scientific terms have the same meaning as terms commonly understood by those skilled in the art as long as the terms are not defined differently. It should be understood that the terms defined in commonly used dictionaries have meanings consistent with those of the prior art.

The foregoing descriptions are merely specific implementation of the present disclosure, but the protection scope of the present disclosure is not limited thereto. Any of those skilled in the art can easily think of changes or replacements within the technical scope disclosed by the present disclosure, should be covered by the protection scope of the present disclosure. Therefore, the protection scope of the present disclosure is subject to the protection scope of the claims.

The invention claimed is:

1. An item sorting system, comprising:
   a supply end, which is configured to provide at least one to-be-sorted item, wherein the supply end forms a first area;
   at least one moving transport apparatus, which is configured to receive a to-be-sorted item and deliver the received to-be-sorted item, wherein the at least one moving transport apparatus is configured to transport the received to-be-sorted item within a second area, wherein the second area is an annular area, and the first area is located in an inner annular area of the second area; and
   at least one item receiving apparatus, which is configured to receive in a third area the to-be-sorted item delivered by the at least one moving transport apparatus;
   wherein a bottom of the at least one moving transport apparatus and a bottom of the at least one item receiving apparatus are in a same plane, a scheduling area is located between the second area and the third area, and the scheduling area partially or totally surrounds the third area; and
   wherein the at least one moving transport apparatus is further configured to enter the scheduling area from the second area, pass through the scheduling area to deliver received to-be-sorted items to the at least one item receiving apparatus successively and then leave the scheduling area in turn.

2. The item sorting system according to claim 1, wherein a bottom of the supply end and a bottom of the at least one moving transport apparatus are on a same plane.

3. The item sorting system according to claim 2, wherein the moving transport apparatus is configured to operate on the ground, and the item receiving apparatus is configured on the ground.

4. The item sorting system according to claim 1, wherein the at least one moving transport apparatus is configured to operate on the ground, and the at least one item receiving apparatus is configured on the ground.

5. The item sorting system according to claim 1, wherein, the third area is an annular area, and the second area is located in an inner annular area of the third area.

6. The item sorting system according to claim 1, wherein the third area comprises a plurality of independent areas, and the plurality of independent areas are arranged in order and dispersedly at an edge of an outer annular area of the second area.

7. The item sorting system according to claim 1, further comprising:

a delivery information acquisition apparatus, which is configured to acquire item information of the at least one to-be-sorted item provided by the supply end, wherein the item information comprises destination information of the at least one to-be-sorted item.

8. The item sorting system according to claim 7, further comprising:
control system, which is configured to respectively communicate with the delivery information acquisition apparatus and the at least one moving transport apparatus.

9. The item sorting system according to claim 8, wherein, when the delivery information acquisition apparatus is incapable of reading the item information correctly, the control system is configured to control the at least one moving transport apparatus to deliver an item corresponding to the item information failing to be read correctly to a specified position.

10. The item sorting system according to claim 8, wherein,
when the delivery information acquisition apparatus is incapable of reading the item information correctly, the control system is configured to control the supply end to retrieve an item corresponding to the item information failing to be read correctly.

11. The item sorting system according to claim 8, wherein,
when the delivery information acquisition apparatus is incapable of reading the item information correctly, the control system is configured to control the delivery information acquisition apparatus to prompt information.

12. The item sorting system according to claim 8, wherein,
the control system is configured to acquire a number of the at least one to-be-sorted item provided by the supply end, and determine a number of the at least one moving transport apparatus required by the supply end based on the number of the at least one to-be-sorted item.

13. The item sorting system according to claim 8, wherein,
the control system is configured to acquire a number of the at least one to-be-sorted item provided by the supply end, and control rearrangement of the item receiving apparatus in the third area based on the number of the at least one to-be-sorted item.

14. The item sorting system according to claim 1, wherein,
the at least one moving transport apparatus is capable of identifying automatically delivery information of the to-be-sorted item, and delivering a to-be-sorted item allocated to the at least one moving transport apparatus to the corresponding item receiving apparatus based on the delivery information.

15. An item sorting method, comprising:
distributing, by a supply end located in a first area, a to-be-sorted item to a moving transport apparatus;
receiving, by the moving transport apparatus, the to-be-sorted item from the supply end, delivering the received to-be-sorted item through a specific transport path, wherein the moving transport apparatus transports the received to-be-sorted item within a second area, wherein the second area is an annular area, and the first area is located in an inner annular area of the second area; and
receiving, by an item receiving apparatus, in a third area the to-be-sorted item delivered by the moving transport apparatus;
wherein a bottom of the item receiving apparatus and a bottom of the moving transport apparatus are on a same plane, a scheduling area is located between the second area and the third area, and the scheduling area partially or totally surrounds the third area; and
wherein the moving transport apparatus enters the scheduling area from the second area, passes through the scheduling area to deliver the received to-be-sorted item to the item receiving apparatus and then leaves the scheduling area.

* * * * *